(12) United States Patent
Shoberg et al.

(10) Patent No.: US 6,253,626 B1
(45) Date of Patent: Jul. 3, 2001

(54) THREE-AXIS TRANSDUCER BODY AND STRAIN GAGE ARRANGEMENT THEREFOR

(75) Inventors: Ralph S. Shoberg, Farmington Hills; Gary L. Barrett, Union Lake, both of MI (US)

(73) Assignee: RS Technologies, Ltd., Farmington Hills, MI (US)

(*) Notice: Subject to any disclaimer, the term of this patent is extended or adjusted under 35 U.S.C. 154(b) by 0 days.

(21) Appl. No.: 09/387,384

(22) Filed: Sep. 2, 1999

(51) Int. Cl.$^7$ ........................................... G01L 1/22
(52) U.S. Cl. ..................... 73/862.044; 73/775; 73/795
(58) Field of Search .................. 71/795, 774, 775; 73/862.041, 862.042, 862.043, 862.044, 862.045, 862.046

(56) References Cited

U.S. PATENT DOCUMENTS

| | | | |
|---|---|---|---|
| 4,628,745 | * 12/1986 | Hatamura | 73/862.042 |
| 4,640,138 | * 2/1987 | Meyer et al. | 73/862.045 |
| 4,695,963 | * 9/1987 | Sagisawa et al. | 395/93 |
| 4,823,618 | * 4/1989 | Ramming | 73/862.045 |
| 5,315,882 | * 5/1994 | Meyer et al. | 73/862.44 |

OTHER PUBLICATIONS

C.C. Perry & H.R. Lissner, "The Strain Gage Primer" 2nd Edition, McGraw–Hill Book Company (1955).
Sketch of M.C. Shaw Ring Transducer Body, 1956.
"Strain Gage Based Transducers" 2nd Ed. The Technical Staff of Measurements Group, Inc. (1988) Chapter 2: "Load Cells".

* cited by examiner

*Primary Examiner*—Max Noori
(74) *Attorney, Agent, or Firm*—Young & Basile, P.C.

(57) ABSTRACT

A transducer body having a traditional single-axis envelope capable of multi-axis measurements. The transducer body includes coaxial base ends with an intermediate flexure element in the form of a ring having an internally centered stiffening web which reduces deflection and localizes strain for accurate high-capacity single-axis load measurements, as well as for bending and shear. The invention further includes a novel arrangement of strain gages on the transducer body, preferably including three sets: strain gages on the stiffening web to measure single-axis loading along the longitudinal axis of the transducer body; bending measurement strain gages spaced at 45° around the periphery of the ring element; and shear measurement strain gages located at 90° locations on the periphery of the ring.

14 Claims, 7 Drawing Sheets

THREE-AXIS TRANSDUCER BODY AND STRAIN GAGE ARRANGEMENT THEREFOR

FIELD OF THE INVENTION

The present invention is in the field of transducer bodies used for mounting strain gages.

BACKGROUND OF THE INVENTION

Strain gage based transducers for translating an input of mechanical energy into equivalent electrical signals are well-known in the art. Force-measuring transducers, referred to as "load cells", typically comprise a "spring element" or "flexure element" of metal with strain gages bonded to its surface to measure bending, direct stress, or shear. For purposes of this application the physical structure incorporating the spring or flexure element will generally be referred to as a "transducer body".

In terms of force-measuring capacity there are generally two classes of transducer body: low capacity bodies of the "bending element" type, for example rings and cantilever beams; and, high capacity bodies of the shear-web and column types.

Cantilever-beam and ring-shaped transducer bodies are relatively flexible, low force transducer bodies, being useful for measuring only up to about 1,000 pounds of force.

In the high capacity category, I-beam and column shapes excel for axial loading above 1,000 pounds, but present unique problems in terms of accurate measurement, for example "cross-talk" errors from off-axis load and bending components. For these and other reasons, column-type load cells have been noted by at least one well-known authority as waning in popularity.

Figure 1:
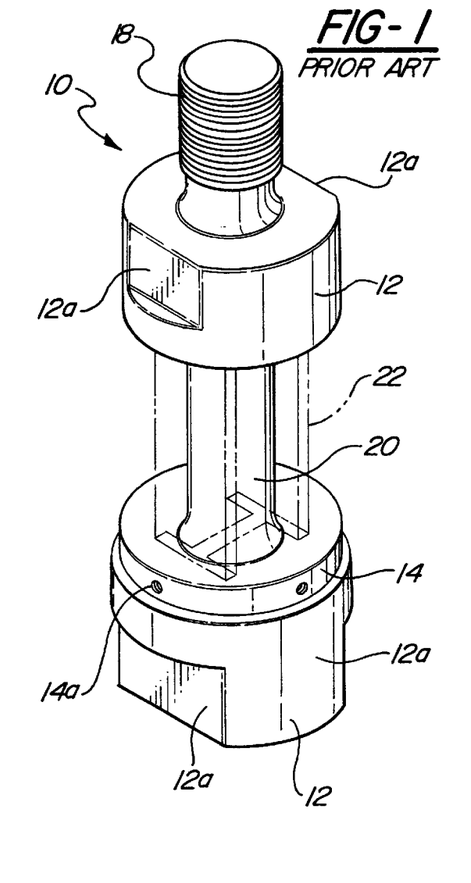
FIG. 1 is a perspective view of a prior art single-axis transducer body or "envelope", showing both column and I-beam style flexure elements in solid and phantom lines, respectively, between the base ends.

FIG. 1 illustrates a prior art column type transducer body in solid lines, with an alternate I-beam style illustrated in phantom lines. The transducer body of FIG. 1 includes ends designed to be threaded into axial connection with two objects between which a force is generated, for example a hydraulic cylinder and tool operated by the cylinder. Transducer bodies of the type illustrated in FIG. 1 are sometimes referred to as "single-axis envelopes" because they are designed for single-axis load measurements.

As noted above, single-axis column or I-beam type transducer bodies such as those illustrated in FIG. 1 are typically preferred for higher force-measuring applications, i.e. over 1,000 pounds. Below that range the column and I-beam shapes do not deform sufficiently, or have to be made too small in diameter to be usefully stable.

SUMMARY OF THE INVENTION

In its broadest aspect, the present invention is a ring-type flexure element formed into a single-axis envelope of the type illustrated in FIG. 1, replacing the typical column or I-beam.

The ring-type flexure element in a single-axis envelope (axis-1) allows the transducer body to be used for truly accurate multi-axis force measurements when strain gages are arranged according to the first aspect.

In another aspect of the present invention, the ring element incorporated into the single-axis envelope is provided with a novel interior stiffening web. The web provides rigidity to the ring, reducing the deflection of the relatively soft ring and helping to localize strain under strain gages mounted on the ring element. In the preferred, illustrated form the web is perforated in a symmetrical pattern, which for single axis loading localizes (concentrates) strains immediately under the strain gages.

Sets of strain gages are mounted directly on the flat surfaces of the web inside the ring to measure single-axis compression/tension loading. Used only with these web-mounted gages, the inventive transducer body is capable of more accurate high capacity single-axis measurements than a traditional column element or "H" section. Bending and shear measurements on the inventive transducer body with strain gages located at 45° and 90° around the outside of the ring provide the means to measure axis-2 and axis-3 forces. This combination of web-mounted and ring-mounted strain gaging provides true three-axis measurement not previously available.

The 45° strain gaging on the outside of the ring measures axis-2 forces proportional to side-bending strains, something not possible with single-axis envelopes of the type shown in FIG. 1. The web with holes as located enhances the performance for axis-2 measurements over what could be obtained by gaging a simple proving ring structure on its own. Additionally, the 90° strain gaging on the outside of the ring to measure shear is an improvement over the old style proving ring

DETAILED DESCRIPTION OF THE ILLUSTRATED EMBODIMENT

Referring first to FIG. 1, a representative prior art single-axis transducer body of the column or I-beam type is referred to generally by reference numeral 10. Transducer body 10 is typically machined from a metal such as steel, and generally comprises base ends 12 with wrench flats 12a; a reduced diameter base portion 14 at one end with threaded mounting holes 14a for a protective sleeve of known type (not shown); threaded mounting ends 16, 18; and a column type flexure element 20 (solid lines) or an H- or I-beam type flexure element 22 (phantom lines). The illustrated example 10 in FIG. 1 is of the type designed to be mounted to measure single-axis forces, for example by being threaded at one end 18 into a hydraulic cylinder and at the other end to a tool acted on by the cylinder to generate signals representing the force generated by the cylinder. Specifically, transducer 10 measures compression and tension along the longitudinal axis (axis-1) of the transducer body.

Figure 2:
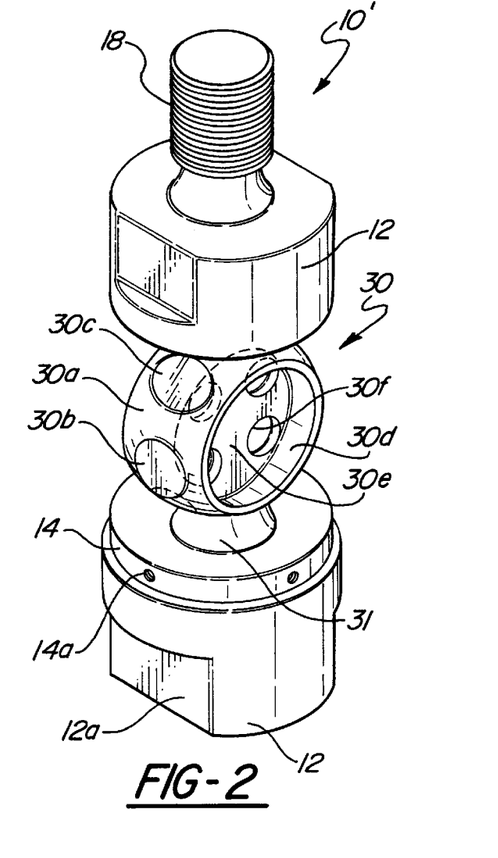
FIG. 2 is a perspective view of a single-axis transducer envelope according to the present invention, with a novel ring type flexure element including an internal web.
Figure 3:
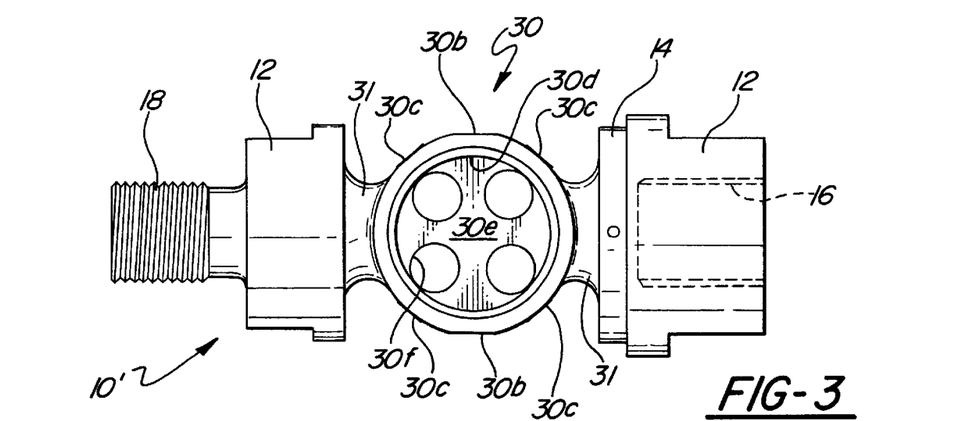
FIG. 3 is a front elevational view of the transducer body of FIG. 2.
Figure 4:
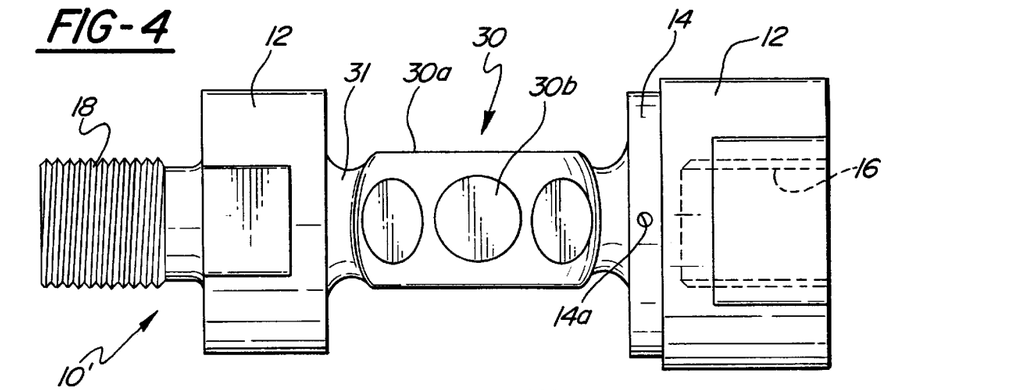
FIG. 4 is a side elevational view of the transducer body of FIG. 3.

The present invention is shown in FIGS. 2 and 3. A transducer body 10' according to the present invention generally uses a single-axis envelope as shown in FIG. 1, but modifies it with a novel ring type flexure element 30 which makes it capable of more accurate high-capacity single-axis measurements, as well as bending and shear measurements along other axes. Flexure ring 30 is an integrally machined part of transducer body 10', integrally joined to base ends 12 by generous fillets 31. Ring 30 has a rounded outer surface 30a with strain gage-mounting flats 30b and 30c machined into surface 30a. The interior surface 30d of ring 30 is preferably "flat", being a cylindrical, constant diameter bore through the ring, in contrast to the rounded spherical or near-spherical outer surface radius of ring 30.

A novel deflection-reducing stiffening web 30e is located in the center of ring 30, aligned with the longitudinal axis of transducer body 10' as a planar segment bisecting the ring. The faces of web 30e are flat for mounting strain gages in a manner described below. Web 30e in the illustrated embodiment is provided with a symmetrical array of holes 30f which assist in stiffening the web, reducing deflection and localizing strain on the mounted gages. In the illustrated embodiment four holes 30f are provided, tangentially meeting the interior surface of the ring at points corresponding to the axes of four strain gage mounting flats 30c located at 45° circumferential positions around the exterior surface 30a of the ring.

Internal web 30e adds rigidity to the relatively soft ring shape, and further helps make strain uniform around the ring by reducing deflection. This has the effect of "localizing" strain at the gages because, ideally, strain would be concentrated under only the strain gages and minimized elsewhere. Deflection causes undesirable side loads mainly through rotation/distortion of measurement axis directions (and additionally results in lower natural frequencies which interfere with force measurement).

Accordingly, the overall transducer 10' deflects when under load; the overall load on the relatively soft ring is kept small; the load on the stiff web 30 is high and localized; deflection on the ring is reduced, reducing the overall deflection measured between the base ends of the transducer body.

By localizing strain and lowering both local and overall deflection, the natural frequency of the transducer body is desirably raised, allowing the measurement of a dynamic signal (for example, hydraulic cylinder pulsing with a frequency of one second or less) which a soft, low natural frequency transducer body might not accurately sense due to its short duration. Additionally, side loading induced strains are reduced, eliminating false loading signals. For example, if it is desirable to measure a single-axis compressive force, side loading would generate an error since the ideal of perfect loading along the strain gage axis is not achieved. To the extent side loading is reduced, therefore, the ideal of perfect loading along the single-axis strain gage is achieved.

Figure 5:
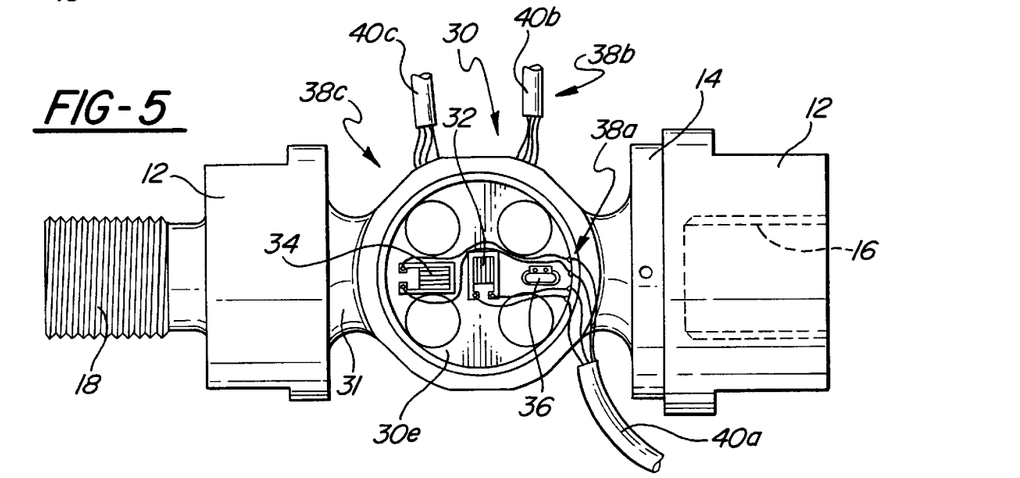
FIG. 5 illustrates the inventive transducer body with strain gages and associated wiring mounted on the stiffening web.
Figure 6:
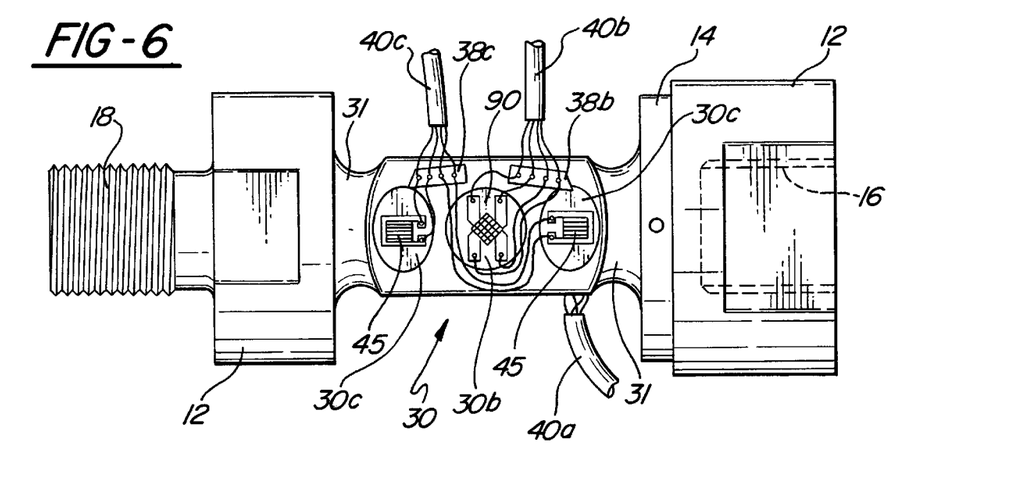
FIG. 6 is a side view of the transducer body and strain gaging shown in FIG. 5, illustrating additional strain gaging on the outside surface of the ring.

Internal web 30e provides additional strain gage mounting advantages not found in the prior art. Referring next to FIGS. 5 and 6, the flat faces of web 30e make ideal strain gage mounting locations inside the ring almost directly on and parallel to the longitudinal axis of transducer body 10'. As illustrated in FIG. 5, strain gages 32 and 34 located on each face of web 30e are positioned with their respective axes parallel to and perpendicular to the longitudinal axis of transducer body 10', to alternately and oppositely measure compression and tension loading forces generated by force exerted along the longitudinal axis.

FIG. 5 also illustrates a compensation resistor 36 of known type mounted on each face of web 30e for the purpose of zeroing or balancing each set of strain gages wired together to form a bridge. In the illustrated embodiment, one compensation resistor 36 is preferably of the type which can be selectively abraded to change its resistance to balance a bridge to within a specified zero offset when there is no load on the transducer. The compensation resistor 36 on the opposite side is preferably used to adjust for changes in zero in response to temperature variations. The use of compensation resistors 36 to balance or zero bridged strain gage sets is known in the art and need not be discussed in greater detail here.

In the illustrated embodiment, strain gages 32 and 34 on web 30e are of the type commonly available. Compensation resistors 36 are also available from several manufacturers.

Figure 12:
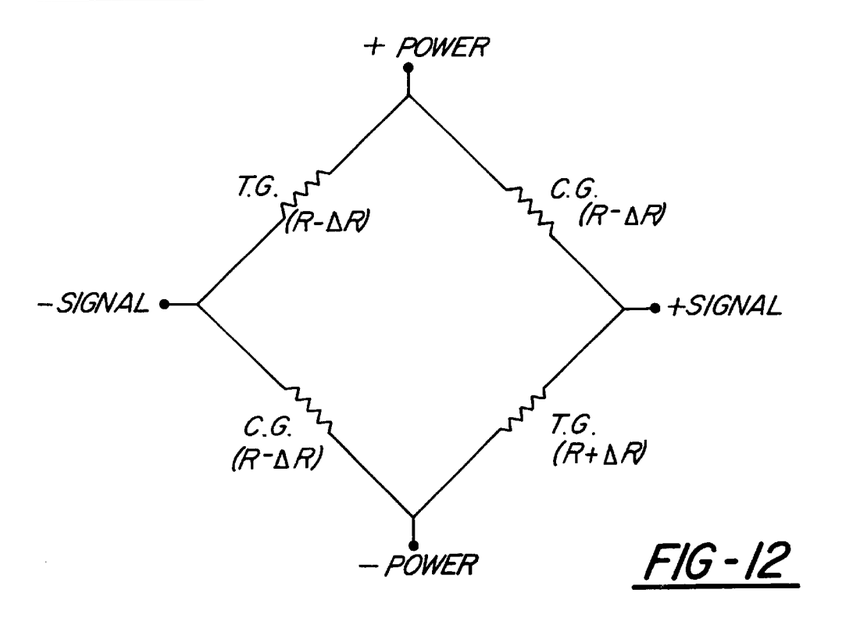
FIG. 12 is a schematic representation of the general Wheatstone bridge connection of each set of four strain gages on the inventive transducer body.

The inputs and outputs of strain gages 32 and 34 on each side of web 30e are connected by thin copper wire to four-wire terminals 38a and the terminals of compensation resistors 36 in a manner known to those skilled in the art, in a four-gage "Wheatstone bridge" schematically shown in FIG. 12. Terminals 38a are also available from more than one commonly used strain gage supply source.

Referring next to both FIGS. 5 and 6, sets of symmetrically arranged strain gages 45 and 90 are mounted on the external surface 30a of ring 30 on 45° and 90° axes through the ring. As described above, strain gages 45 and 90 are mounted on flats 30b, 30c machined into the exterior surface 30a of the ring. In the illustrated embodiment of FIG. 6, 45° strain gages 45 are illustrated as a commercially available unidirectional type, while the 90° strain gages 90 are a commercially available bi-directional type. Strain gages 45 are connected in a bridge circuit, and strain gages 90 are connected in a bridge circuit.

It will be understood that the side view of FIG. 6 only illustrates two of the four 45° strain gages 45 mounted on ring 30, and only one of the two 90° strain gages 90 on ring 30. The other halves of the 45° and 90° bridge circuits are located on flats 30*b*, 30*c* on the opposite side of the ring.

Power into the strain gages and signals from the strain gages on transducer body 10' are delivered and received via copper wiring bundled at 40*b*, 40*c* (FIG. 6) and connected electrically to the various strain gages through four-wire terminals 38*b*, 38*c* which in the illustrated embodiment comprise conductive strips, with soldered points for attaching the power and signal wires. Terminals 38*a*, 38*b* and 38*c* are identical in the illustrated embodiment.

Figure 7A:
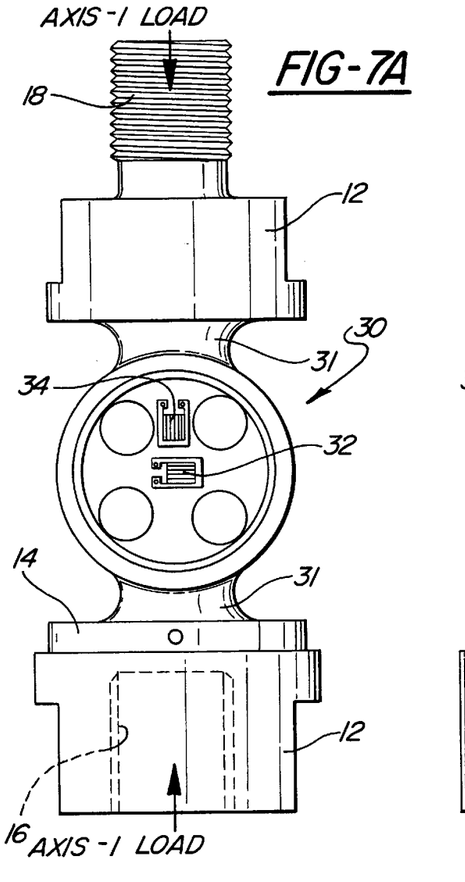
FIGS. 7A and 7B are front and side views of the inventive transducer body, with single-axis compression and tension gaging on the internal ring web, schematically illustrating compression loading forces on the transducer body for a single-axis measurement.
Figure 7B:
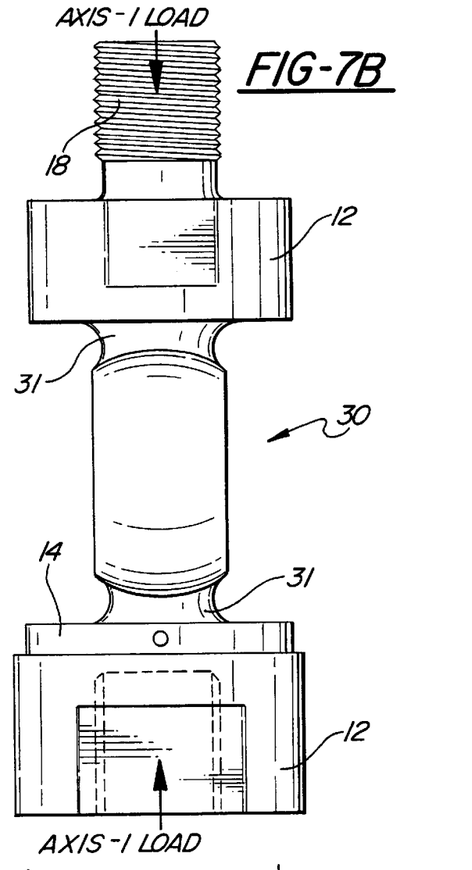

Referring now to FIGS. 7A through 7D, transducer 10' according to the present invention is illustrated with strain gages 32, 34 undergoing traditional "single-axis" loading along the transducer's longitudinal axis ("axis-1"). Referring first to FIGS. 7A and 7B, the illustrated "load", shown schematically by arrows, is a compression loading along the longitudinal axis of the transducer body. It will be understood by those skilled in the art that loading in tension along the same axis would also be measured by strain gages 32, 34.

The side view in FIG. 7B is used to illustrate that there is no shear or bending load under the ideal single-axis compression/tension loading scenario of FIG. 7A. Accordingly, none of the strain gages 45, 90 normally mounted around the periphery of ring 30 are illustrated in FIG. 7B, because they would not generate significant signals under this single-axis loading due to the deflection-reducing and strain localizing function of web 30*e*. Web 30*e* localizes the single-axis compression/tension loading on strain gages 32, 34.

Figure 7C:
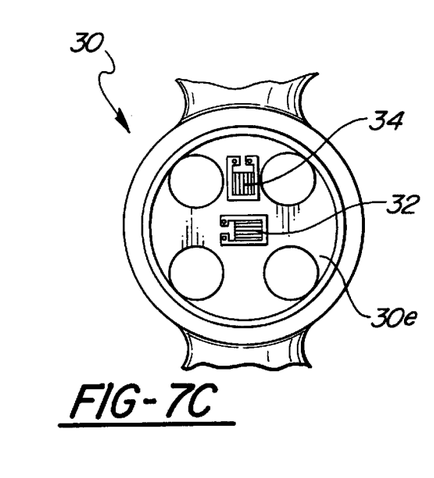
FIGS. 7C and 7D illustrate in exaggerated form the deformations induced by axis-I compression loading of the ring element with the applied force shown in FIGS. 7A and 7B.

FIG. 7C schematically illustrates ring element 30 under a "no load" condition, i.e. it is not deflected or deformed in any manner because there is no load on the structure.

Figure 7D:
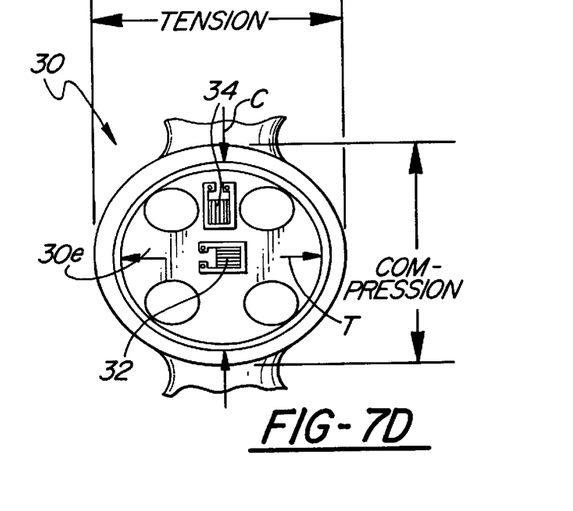

FIG. 7D schematically illustrates in exaggerated manner the deflection caused by the single-axis compression loading of FIG. 7A, in which ring 30 is deflected to an oval or egg shape in which strain gage 34 measures the compression components "C", and strain gage 32 measures the tension components "T", localized on web 30*e*. It will be understood by those skilled in the art that a tensile loading along the longitudinal axis of the transducer body would result in opposite "tension" and "compression" measurements by strain gages 32, 34 as compared to those shown in FIG. 7D.

Figure 8A:
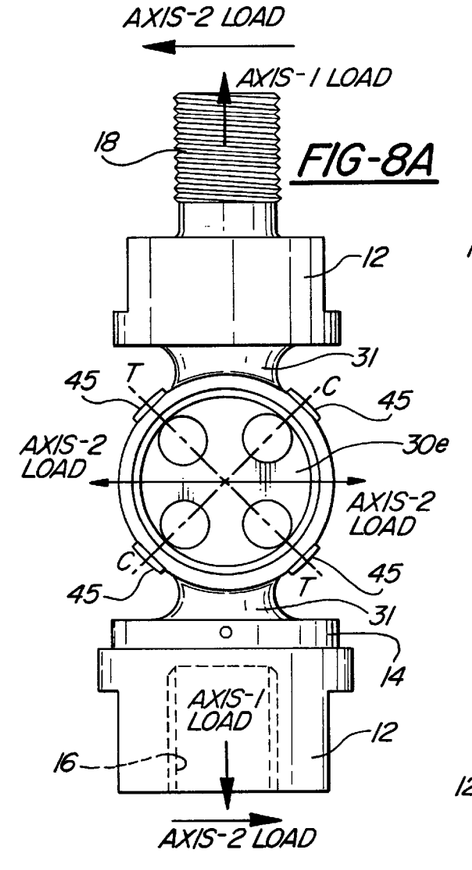
FIGS. 8A and 8B show the inventive transducer body in front and side views, illustrating 45°-axis strain gaging mounted on the outside of the ring for measuring a second-axis load (force)
Figure 8B:
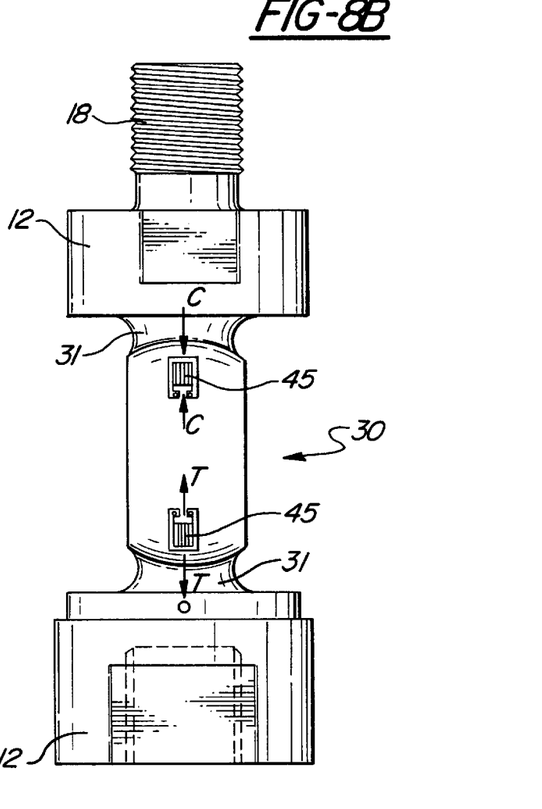

Referring next to FIGS. 8A through 8D, transducer body 10' according to the present invention is illustrated with its 45° strain gages 45 measuring an "axis-2" bending load applied in the direction of the arrows marked "load" in FIG. 8A. With the load illustrated in FIG. 8A, the upper left and lower right strain gages 45 will be in tension and generate tension signals (T), whereas the upper right and lower left strain gages 45 will be in compression and generate compression signals (C). It will be understood by those skilled in the art that a load applied in the opposite direction from that shown in FIG. 8A will result in opposite tension/compression readings from the gages in the circuit.

Figure 8C:
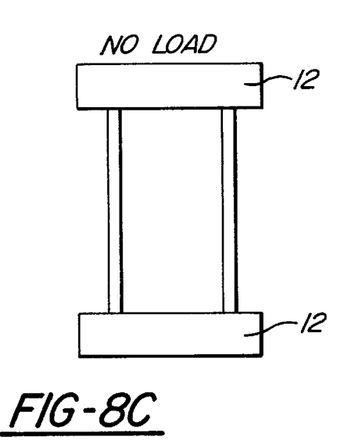
FIGS. 8C and 8D illustrate in exaggerated fashion the deformation of the ring relative to the 45° outside strain gaging and bending forces illustrated in FIGS. 8A and 8B.
Figure 8D:
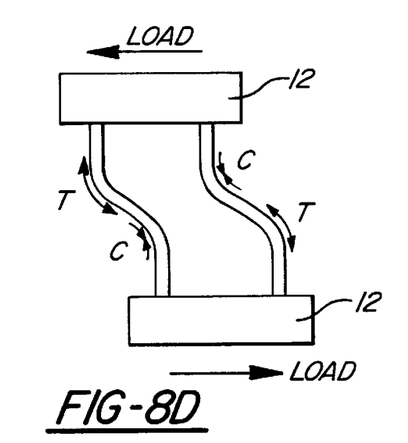

FIG. 8C schematically illustrates the no-load condition of ring 30, while FIG. 8D schematically illustrates in exaggerated fashion the deflection of ring 30 under the loading shown in FIG. 8A.

Figures 9A, 9B:
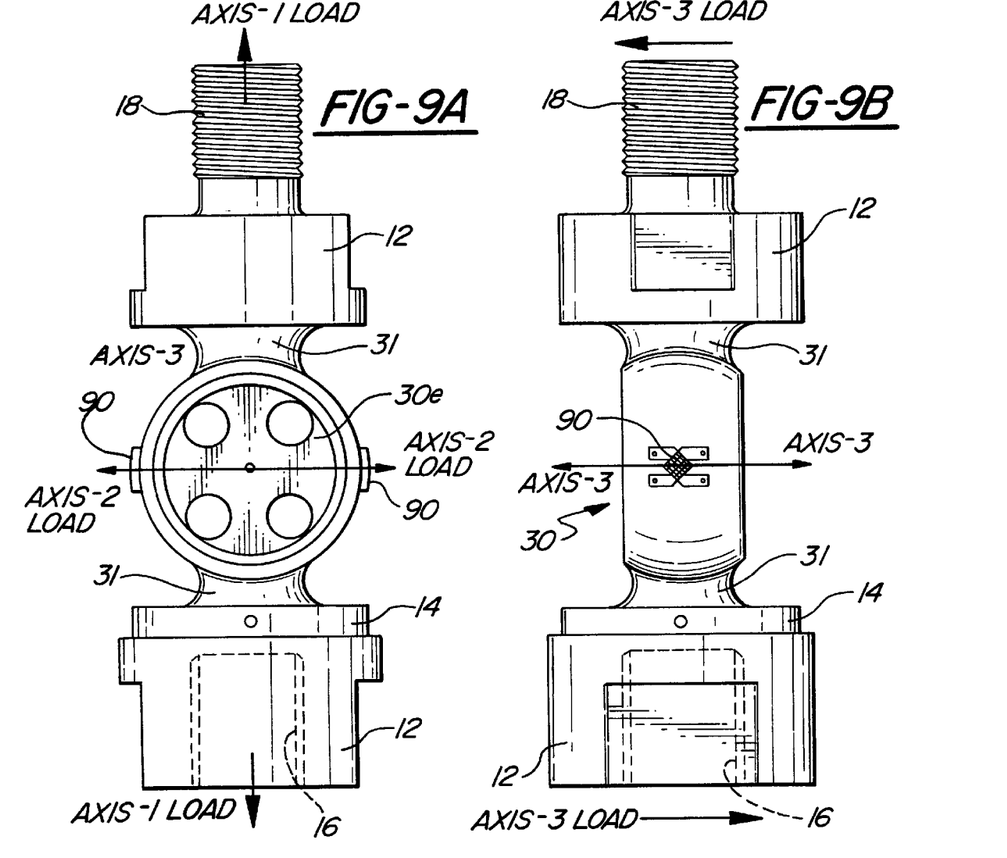
FIGS. 9A and 9B illustrate the inventive transducer body in front and side views, with 90° strain gaging for measuring a schematically illustrated shear load along a third axis.
Figure 9C:
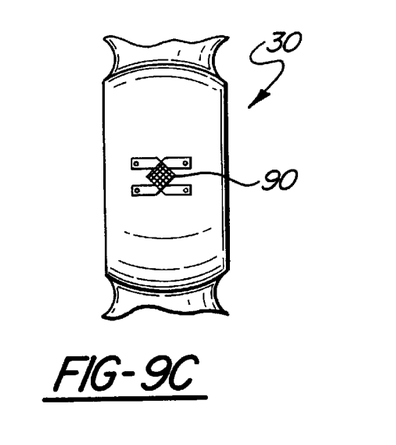
FIGS. 9C and 9D illustrate in exaggerated fashion the deformation of the transducer body in response to the shear forces of FIGS. 9A and 9B.
Figure 9D:
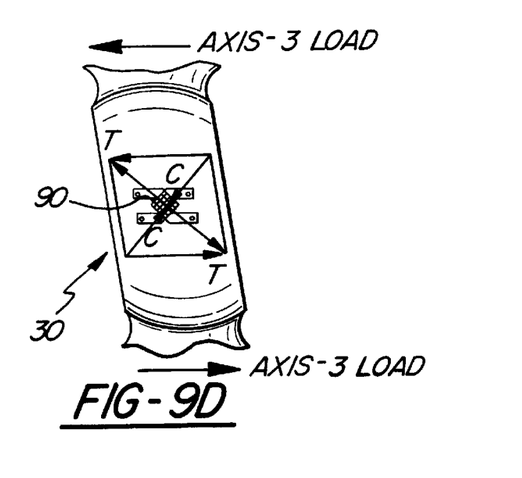

Referring next to FIGS. 9A through 9D, a shear-type load along a third axis ("axis-3") is illustrated schematically, measured by 90° strain gages 90. Referring to FIGS. 9A and 9B, the illustrative shear load primarily (and ideally) is localized with respect to 90° strain gages 90 as best shown in FIG. 9B, such that strain gages 90 are the only strain gages significantly affected by the shear load and which generate a corresponding signal. FIG. 9C schematically illustrates the no-load condition of ring 30 and strain gages 90, while FIG. 9D schematically illustrates in exaggerated fashion the deflection of ring 30 and of strain gage 90 under the shear load illustrated in FIG. 9B. Referring to the schematic bridge illustration of FIG. 12 (which represents strain gage 90), certain strain gage portions of the bridge are in tension, while the opposing gages are in compression. It will be understood by those skilled in the art that a shear load in the opposite direction will result in opposite compression/tension readings from the gages in the bridge circuit.

From the foregoing it will be apparent to those skilled in the art that the transducer body 10' according to the present invention, with its unique single-axis envelope ring structure, its unique internal web structure for reducing deflection and localizing strain around the ring, and its unique mounting of strain gages 32, 34, 45, and 90, is capable of accurately measuring not only the traditional single-axis loads for which such single-axis envelopes are used, but also can accurately measure bending and shear loads, making it a truly multi-axis transducer.

Figure 10:
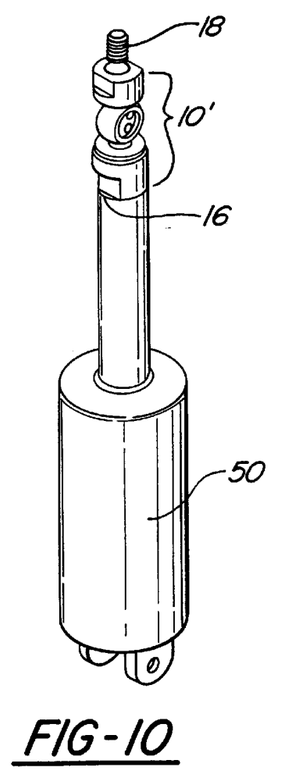
FIG. 10 represents one application of the transducer body according to the present invention for a hydraulic cylinder force measurement along a single-axis.
Figure 11:
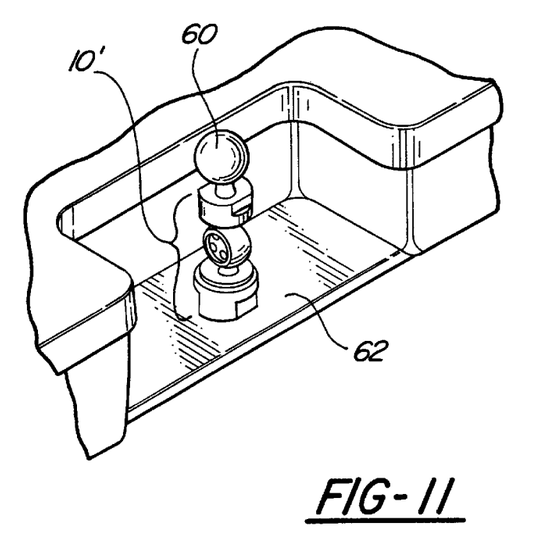
FIG. 11 represents another application of the inventive transducer body for multi-axis trailer hitch force measurements.

Referring to FIGS. 10 and 11, two exemplary applications of transducer body 10' are illustrated. In FIG. 10, transducer 10' is used in a traditional single-axis load measuring function, threaded at one end to a hydraulic cylinder 50, and attached at its upper threaded end 18 to either a cylinder mount or a tool operated by the cylinder (not shown). In this hydraulic cylinder application, the force measurements will be single-axis compression and tension loading measurements as illustrated in FIGS. 7A through 7D.

Referring next to FIG. 11, the same transducer 10' according to the invention is illustrated in use for measuring the forces on a trailer hitch ball 60. Trailer hitch ball 60 is threaded into upper end 18 of transducer 10', while the lower threaded socket end 16 of transducer 10' is screwed onto a threaded mount on the trailer hitch portion 62 of a vehicle. In the application illustrated in FIG. 11, the full multi-axis measuring capability of transducer 10' is utilized, since the trailer hitch ball 60 is likely to undergo single-axis, bending, and shear loading in the course of attaching and pulling a trailer. Accordingly, transducer 10' in applications such as that shown in FIG. 11 will measure all of the different types of loading forces illustrated in FIGS. 7A through 7D, 8A through 8D, and 9A through 9D.

Figure 13:
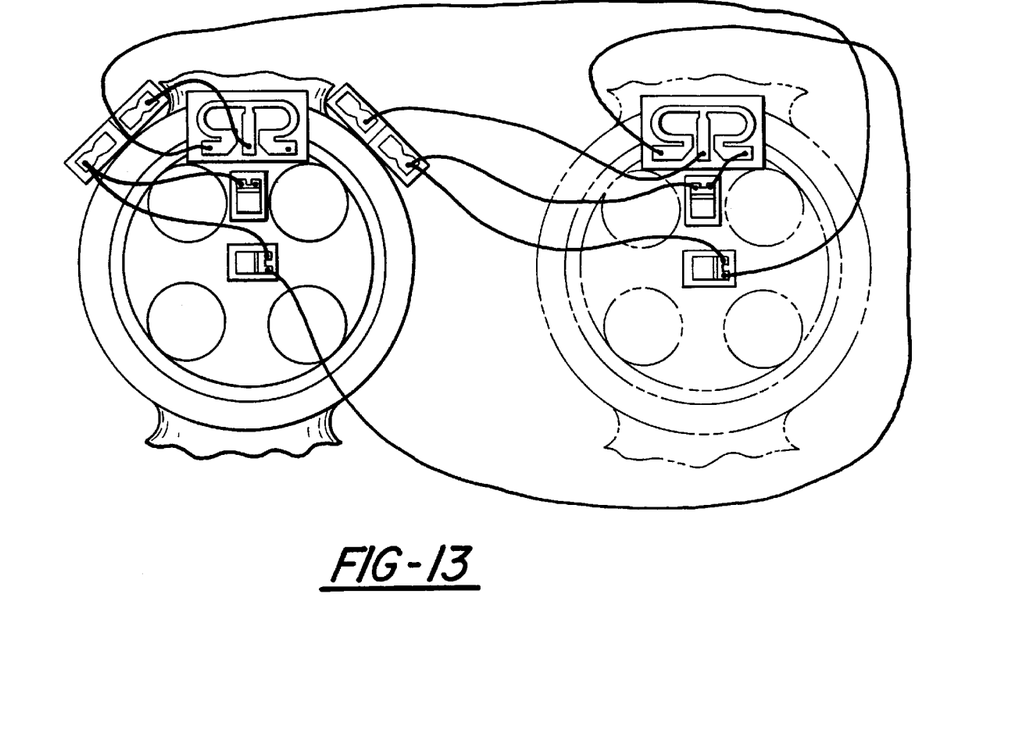
FIG. 13 is a schematic illustration of the wiring of the web-mounted strain gages and associated compensating resistors; and, FIG. 14 is a schematic illustration of the bridging connection between the strain gages and balancing resistors of FIG. 13, which are illustrated as zero balance and temperature zero coefficient adjusting resistors of the type commonly used in transducer production.
Figure 14:
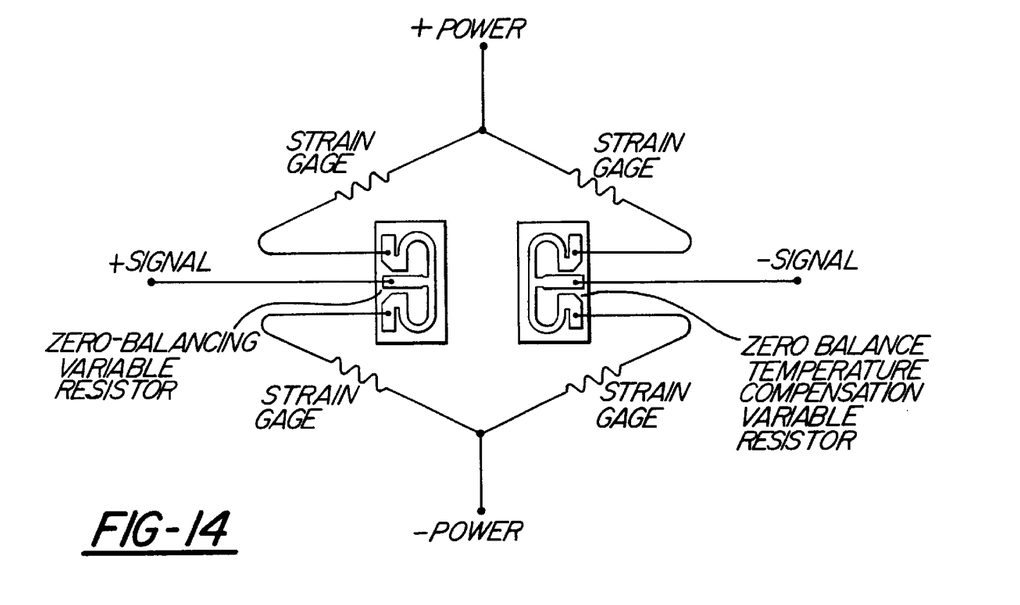

FIGS. 13 and 14 illustrate a preferred bridge circuit wiring arrangement for resistors 32, 34 and compensating resistors 36. It will be understood by those skilled in the art that similar bridge wiring can be used for gages 45 and gages 90, with or without resistors 36.

The foregoing description of an illustrated embodiment of the invention represents a preferred example of the invention, and is not intended to be limiting beyond the scope of the following claims. It will be apparent to those skilled in the art that the relative size and dimensions of transducer body 10' and of the novel ring element and web structure 30 can vary according to the intended force-measuring application. It will also be apparent to those skilled in the art that while the strain gage mounting arrangements illustrated above is preferred, the number of strain gages and the placement of strain gages may vary depending on the application and the desired force measurement. Of course, the specific types of strain gages used will be limited only by commercial availability. These and other features of the invention may be subject to modification by those skilled in the art to adapt the inventive transducer body to different applications, and still lie within the scope of the claims, now that I have disclosed the above embodiments of my invention. Accordingly, I claim:

What is claimed is:

1. A multi-axis strain gage transducer body comprising:
   a single-axis transducer body having coaxial upper and lower base ends and a flexure element coaxial with and integrally joining the upper and lower base ends, wherein the flexure element comprises a ring element with a bore extending transversely through a longitudinal compression-tension axis of the transducer body, the ring element including an internally centered stiffening web in the bore forming a planar segment of the ring bisecting the ring and bisected by the longitudinal compression-tension axis of the transducer body, the stiffening web adapted to mount strain gages on at least one face thereof.

2. A transducer as defined in claim 1, wherein the ring element has a spherically curved outer surface and a cylindrical bore.

3. A transducer body as defined in claim 2, wherein the ring element is integrally joined to the upper and lower base ends of the transducer body over a portion of the spherical outer surface.

4. A transducer body as defined in claim 1, wherein the stiffening web is perforated to define strain-localized strain gage mounting regions on an outer surface of the ring element.

5. A multi-axis strain gage transducer body comprising:
   a single-axis transducer body having coaxial upper and lower base ends and a flexure element coaxial with and integrally joining the upper and lower base ends, wherein the flexure element comprises a ring element with a bore extending transversely through a longitudinal compression-tension axis of the transducer body, the ring element including an internally centered stiffening web in the bore forming a planar segment of the ring bisected by the longitudinal compression-tension axis of the transducer body, the stiffening web adapted to mount strain gages on at least one face thereof, wherein the stiffening web is symmetrically perforated with holes each having a circumferential portion tangential to the bore of the ring element, thereby defining strain-localized strain gage mounting regions on an outer surface of the ring element.

6. A transducer body as defined in claim 5, wherein the symmetrical holes comprise four holes aligned along 45° axes through the ring element, and the outer surface of the ring element includes four strain gage mounting surfaces each aligned along the 45° axes with one of the four holes.

7. A transducer body as defined in claim 1, further including a pair of strain gages on each face of the stiffening web, the strain gages in each pair being arranged at right angles to one another to alternately measure tension and compression depending on the direction of loading along the longitudinal compression-tension axis of the transducer body.

8. A transducer body as defined in claim 7, further including strain gages mounted on an outer surface of the ring element on 45° axes through the ring to measure bending loads.

9. A transducer body as defined in claim 7, further including strain gages mounted on an outer surface of the ring element along a 90° axis through the ring perpendicular to the longitudinal axis of the transducer body, to measure shear loading on the transducer body.

10. A transducer body as defined in claim 9, wherein the strain gages along the 90° axis for measuring shear loading comprise a four-gage bridge.

11. A transducer body as defined in claim 1, wherein the base ends include threaded mounting portions for threadably connecting the transducer body to objects between which forces will be generated.

12. A multi-axis strain gage transducer comprising:
   a single-axis transducer body having coaxial upper and lower base ends and a flexure element coaxial with and integrally joining the upper and lower base ends, wherein the flexure element comprises a ring element with a cylindrical bore extending transversely through the transducer body longitudinal axis, the ring element further including an internally centered stiffening web in the bore forming a planar segment of the ring bisecting the ring and collinear with the longitudinal axis of the transducer body;
   a pair of strain gages mounted on each face of the stiffening web, a first strain gage in each pair being parallel to the longitudinal axis of the transducer body, and a second strain gage of each pair being perpendicular to the longitudinal axis of the transducer body;
   four strain gages mounted on an outer surface of the ring element on 45° axes through the ring element; and,
   two bridge-type strain gages mounted on the outer surface of the ring element on opposing sides of the ring element on a 90° axis through the ring element.

13. A transducer as defined in claim 12, wherein the outer surface of the ring element is spherical.

14. A transducer as defined in claim 13, wherein the ring element is integrally joined to the upper and lower base ends of the transducer body over a portion of the spherical outer surface.

* * * * *

UNITED STATES PATENT AND TRADEMARK OFFICE
CERTIFICATE OF CORRECTION

PATENT NO. : 6,253,626 B1  
DATED : July 3, 2001  
INVENTOR(S) : Shoberg

Page 1 of 1

It is certified that error appears in the above-identified patent and that said Letters Patent is hereby corrected as shown below:

Column 2,
Line 23, after the word "ring", insert a period (".") and insert a new paragraph -- These and other features and advantages of the present invention will become apparent upon further reading, with reference to the accompanying drawings. --.

Signed and Sealed this

Twenty-seventh Day of November, 2001

Attest:

NICHOLAS P. GODICI
*Attesting Officer*     *Acting Director of the United States Patent and Trademark Office*